US012617653B2

(12) United States Patent
Walther

(10) Patent No.: US 12,617,653 B2
(45) Date of Patent: May 5, 2026

(54) ELEVATOR OPERATING DEVICE WITH WAITING TIME AND OCCUPANCY SYMBOLIZATIONS

(71) Applicant: INVENTIO AG, Hergiswil (CH)

(72) Inventor: Jacqueline Walther, Emmenbrücke (CH)

(73) Assignee: INVENTIO AG, Hergiswil (CH)

( * ) Notice: Subject to any disclaimer, the term of this patent is extended or adjusted under 35 U.S.C. 154(b) by 857 days.

(21) Appl. No.: 17/921,917

(22) PCT Filed: Apr. 22, 2021

(86) PCT No.: PCT/EP2021/060462
§ 371 (c)(1),
(2) Date: Oct. 27, 2022

(87) PCT Pub. No.: WO2021/219469
PCT Pub. Date: Nov. 4, 2021

(65) Prior Publication Data

US 2023/0174342 A1 Jun. 8, 2023

(30) Foreign Application Priority Data

Apr. 30, 2020 (EP) .................................... 20172258

(51) Int. Cl.
*B66B 3/00* (2006.01)
*B66B 1/34* (2006.01)
(Continued)

(52) U.S. Cl.
CPC ............ *B66B 3/002* (2013.01); *B66B 1/3461* (2013.01); *B66B 1/463* (2013.01); *B66B 1/468* (2013.01);
(Continued)

(58) Field of Classification Search
None
See application file for complete search history.

(56) References Cited

U.S. PATENT DOCUMENTS

| | | | | |
|---|---|---|---|---|
| 4,852,696 | A | 8/1989 | Fukuda et al. | |
| 2015/0096843 | A1 * | 4/2015 | Siddiqui | B66B 1/3476 187/380 |
| 2017/0260023 | A1 | 9/2017 | Zhang | |

FOREIGN PATENT DOCUMENTS

| | | | |
|---|---|---|---|
| CN | 106414292 | A | 2/2017 |
| CN | 109071156 | A | 12/2018 |

(Continued)

OTHER PUBLICATIONS

International Search Report for International Application No. PCT/EP2021/060462 dated Jun. 24, 2021.

*Primary Examiner* — Michelle M Iacoletti
(74) *Attorney, Agent, or Firm* — Knobbe, Martens, Olson & Bear, LLP

(57) ABSTRACT

An elevator operating device for inputting a travel request on a floor of a building has a touch-sensitive screen system, which has a screen region that is visible to a passenger, and a central control device. The central control device controls the screen system in a first mode, to display a first graphical user interface, and in a second mode, to display a second graphical user interface. The first graphical user interface comprises one or two travel direction symbols. The second graphical user interface comprises an edge zone for symbolizing a waiting time until the elevator car arrives on the floor, and a center zone for symbolizing an occupancy of the elevator car by passengers, wherein a displayed degree of filling of the center zone symbolizes an occupancy of the elevator car.

14 Claims, 3 Drawing Sheets

(51) Int. Cl.
*B66B 1/46* (2006.01)
*B66B 3/02* (2006.01)

(52) U.S. Cl.
CPC .......... *B66B 3/02* (2013.01); *B66B 2201/102* (2013.01); *B66B 2201/4623* (2013.01); *B66B 2201/463* (2013.01)

(56) References Cited

FOREIGN PATENT DOCUMENTS

| | | | |
|---|---|---|---|
| CN | 110092248 | A | 8/2019 |
| EP | 1621505 | A1 | 2/2006 |
| EP | 3299323 | A1 | 3/2018 |
| EP | 3543189 | A2 | 9/2019 |
| EP | 3102520 | B1 | 1/2020 |
| JP | 2019108206 | A | 7/2019 |
| KR | 20180044453 | A | 5/2018 |
| WO | WO 2017186869 | A1 | 11/2017 |

* cited by examiner

ELEVATOR OPERATING DEVICE WITH WAITING TIME AND OCCUPANCY SYMBOLIZATIONS

TECHNICAL FIELD

The technology described herein relates in general to an elevator system in a building. Embodiments of the technology relate in particular to an elevator operating device, to an elevator system having such an elevator operating device, and to a method for operating such an elevator system.

SUMMARY

In buildings having elevator systems, elevator operating devices are provided, by means of which a passenger can input an elevator call. In known elevator systems, elevator operating devices are arranged on the individual floors. These elevator operating devices have up/down buttons for the passenger to input the desired travel direction. An elevator controller then causes an elevator car to be moved, for example, to the floor (boarding floor) on which the passenger input the desired travel direction. In this elevator system, an elevator operating device is provided in the elevator car, by means of which device the passenger in the elevator car can input the desired destination floor.

Although a passenger can use the up/down buttons mentioned to call an elevator to the floor, there may be a requirement for an elevator system and/or for a building to offer additional functionality to a passenger. There is therefore a need for a technology that fully or at least partially meets these requirements.

One aspect of the technology described herein relates to an elevator operating device for inputting a travel request on a floor of a building in which an elevator system having an elevator car and an elevator controller is arranged. The elevator operating device has a communication device which is configured to communicate with the elevator controller, a touch-sensitive screen system which has a screen region that is visible to a passenger, and a central control device that is communicatively connected to the communication device and the screen system. The central control device is configured to control the screen system in a first elevator operating mode in order to display a first graphical user interface on the screen region, and to control the screen system in a second elevator operating mode in order to display a second graphical user interface on the screen region. The first graphical user interface comprises one or two travel direction symbols. The second graphical user interface comprises an edge zone that extends in the screen region along a circumference of the screen region and has a specified width. The edge zone is provided for symbolizing a waiting time until the elevator car arrives on the floor, wherein a degree of filling of the edge zone which changes along the circumference symbolizes a changing waiting time. The second graphical user interface also comprises a center zone that can be displayed separately from the edge zone and is provided for symbolizing an occupancy of the elevator car by passengers, wherein a displayed degree of filling of the center zone symbolizes an occupancy of the elevator car.

A further aspect of the technology described herein relates to an elevator system having such an elevator operating device.

Another aspect of the technology relates to a method for operating an elevator system. The method comprises controlling a touch-sensitive screen system of an elevator operating device which is arranged on a floor of a building, in a first elevator operating mode, in order to cause a first graphical user interface which comprises one or two travel direction symbols to be displayed in a screen region of the touch-sensitive screen system, which screen region is visible to a passenger. A travel request is detected when a passenger touches a travel direction symbol. The touch-sensitive screen system is controlled in a second elevator operating mode to cause a second graphical user interface to be displayed in the screen region. The second graphical user interface comprises an edge zone that extends in the screen region along a circumference of the screen region and has a specified width. The edge zone is provided for symbolizing a waiting time until the elevator car arrives on the floor, wherein a degree of filling of the edge zone which changes along the circumference symbolizes a changing waiting time. The second graphical user interface also comprises a center zone that can be displayed separately from the edge zone and is provided for symbolizing an occupancy of the elevator car by passengers, wherein a displayed degree of filling of the center zone symbolizes an occupancy of the elevator car.

The technology described herein creates an elevator operating device that can display two graphical user interfaces separately from one another in the screen region. Which graphical user interface is displayed depends on the elevator operating mode. This not only allows a passenger to input the travel direction by means of the first graphical user interface, but also additional information about the waiting time and the occupancy of the elevator car carrying out the elevator call can be transmitted to the passenger by means of the second graphical user interface. Better informed passengers perceive the elevator system as more user-friendly.

It is also advantageous that the elevator operator is configured as a kind of sole human-machine interface device for the interaction of the passenger with the elevator system and for the transmission of information. The passenger can therefore substantially limit his attention to using the elevator at the elevator operating device. Further information devices on a floor may be omitted under certain circumstances.

The way in which the waiting time and occupancy are symbolized also contributes to user-friendliness. In one embodiment, the degree of filling of the edge zone which changes along the circumference is configured as a decreasing degree of filling of the edge zone, and symbolizes a decreasing waiting time.

In one embodiment, the screen region is circular. As a result, the part of the elevator operating device that is visible to the passenger has an aesthetically pleasing design. Correspondingly, the edge zone and an intermediate zone can be circular. As an alternative thereto, the screen region can be polygonal, for example. As a result, one of a plurality of configurations can be selected for the shape of the elevator operating device on the passenger side.

In one embodiment, the center zone of the second graphical user interface is also provided for displaying a floor on or in the vicinity of which the elevator car is located.

This additional information also contributes to user-friendliness; the passenger can, for example, see that the elevator car is moving in the direction of his floor when the floor display changes, albeit slowly under certain circumstances. In one embodiment, the center zone of the second graphical user interface is also provided for displaying the travel direction of the elevator car.

In one embodiment, the second graphical user interface also comprises an intermediate zone arranged between the edge zone and the center zone. The intermediate zone is provided for displaying a travel direction of the elevator car that corresponds to the travel request. As a result, for example, a further passenger who also wants to use the elevator can recognize whether the elevator car that is about to arrive is already provided for travel in the travel direction desired by the other passenger.

In one embodiment, the center zone is also provided for displaying an operating symbol, a pictogram, or text. In this way, it can be displayed, for example, that the elevator car carrying out a call has arrived on the floor and the elevator doors are opening. In addition, the display can be used flexibly to provide information about an operating state of the elevator system, for example, that the elevator system is out of service or may not be used.

There is also flexibility with regard to the arrangement of the elevator operating device that can be arranged on a shaft door or a shaft door frame of the elevator system or on a building wall. Depending on the building, the elevator operating device can be arranged on a pedestal (or a column) which is fastened to the ground.

In one embodiment, a sensor device is arranged in the elevator system, which sensor device is configured to determine an occupancy of the elevator car by passengers. It is advantageous in this case that the sensor device or the functionality thereof can be implemented in different ways. For example, a load measuring device that is already provided in the elevator system can be used, or an optical measuring device (e.g., a video device) can be installed.

The touch-sensitive screen system used in accordance with the technology described herein comprises a touchscreen. A touchscreen can be produced in different sizes or dimensions depending on the application and requirements. The size of the screen system can thus also be selected according to the requirements in the building. In addition to this flexibility in terms of size, a touchscreen also offers the advantage of having a smooth surface. Dirt can be removed more easily from a smooth surface than, for example, from an arrangement that has one or more buttons having elevations and/or grooves and gaps. This reduces the maintenance outlay.

The technology described herein also allows freedom in terms of configuration, for example, with regard to a shape of the elevator operating device on the passenger side.

The creative freedom extends to the configuration of the user interfaces. In particular in buildings for which a contemporary or modern appearance is desired, the elevator operating devices equipped with touchscreens can help achieve this goal.

BRIEF DESCRIPTION OF THE DRAWINGS

Various aspects of the improved technology are described in greater detail below with reference to embodiments in conjunction with the drawings. In the drawings, identical elements have identical reference signs. In the drawings.

DETAILED DESCRIPTION

Figure 1:
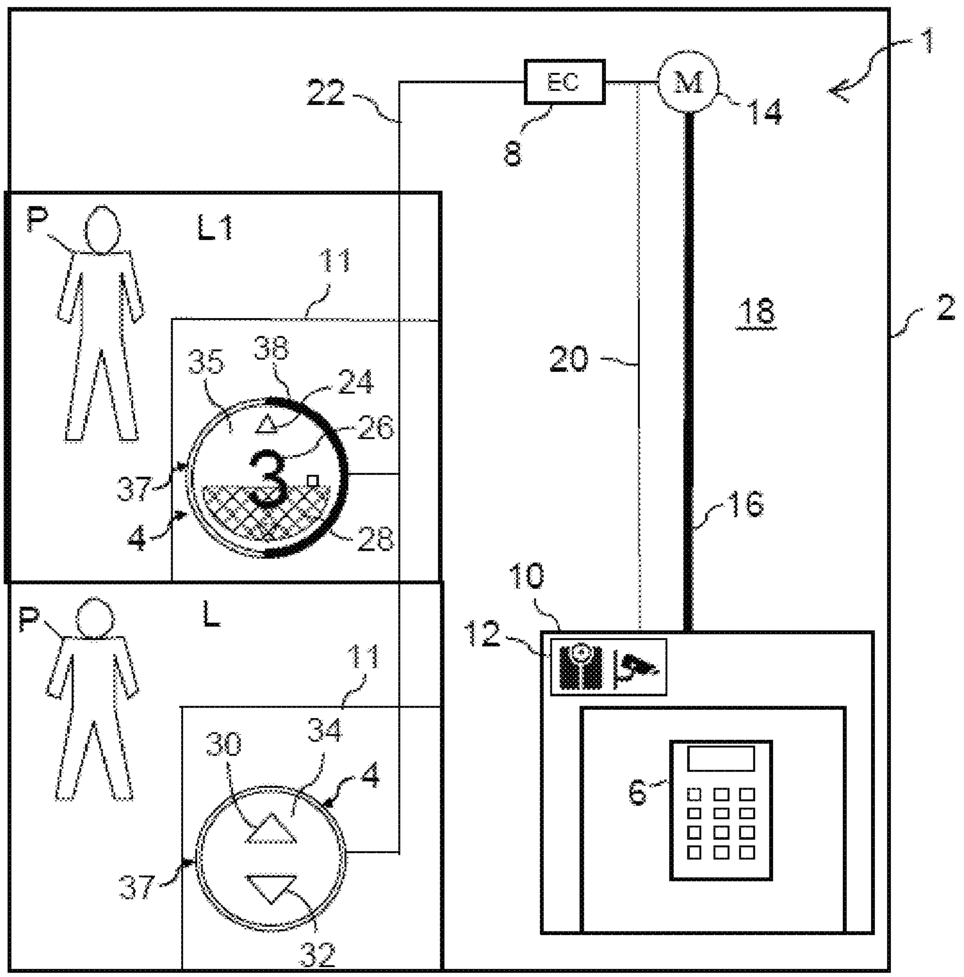
FIG. 1 is a schematic representation of an example of a situation in a building having a plurality of floors and an example of an elevator system.

FIG. 1 is a schematic representation of an example of a situation in a building 2 which has a plurality of floors L, L1 which are served by an elevator system 1. The floor L can be an entrance hall of the building 2, into which the passengers P enter when accessing the building 2 and from which the passengers leave the building 2 again. If a passenger P enters the floor L, each floor L, L1 of the building 2 can be reached from there, with appropriate access authorization, by means of the elevator system 1. For the purpose of illustration, of the elevator system 1, only an elevator controller 8, a drive machine 14, a suspension means or device 16 (e.g., steel cables or flat belts), an elevator car 10 (hereinafter also referred to as car 10), which is suspended on the suspension means 16 and is movable in a shaft 18, and a number of elevator operating devices 4, 6 are shown in FIG. 1. A person skilled in the art would recognize that the elevator system 1 can also comprise a plurality of cars 10 in one or more shafts 18 that are controlled by a group controller. Instead of a traction elevator (shown in FIG. 1), the elevator system 1 can also have one or more hydraulic elevators.

In the situation shown in FIG. 1, an elevator operating device 4 is arranged on each floor L, L1, at which elevator operating device the passenger P can input a desired travel direction and thus call an elevator to the floor L, L1. The floor L, L1 on which the passenger P is located and is calling the elevator is also referred to as the boarding floor.

The passenger P can input a desired destination floor at an elevator operating device 6 arranged in the elevator car 10. This control technology is known to a person skilled in the art, so that more detailed explanations do not appear necessary; in the following, this is only discussed to the extent that it seems helpful for understanding the technology described herein. The embodiments of the technology described below relate to the elevator operating devices 4 arranged on the floors L, L1.

The elevator operating device 4 comprises a touch-sensitive screen system 68 which has a screen region 37 that is visible to a passenger P. The screen system 68 can be controlled depending on the (elevator) operating mode of the elevator system 1. In accordance thereto, the screen region 37 of the elevator operating device 4 displays a first graphical user interface 34 or a second graphical user interface 35. The elevator operating device 4 arranged on the floor L in FIG. 1 displays the first graphical user interface 34 in the screen region 37, which user interface comprises a travel direction symbol 30 for the upward direction and a travel direction symbol 32 for the downward direction. The elevator system 1 is in a first operating mode in relation to this floor L, in which operating mode a desired travel direction (elevator call) can be input at the elevator operating device 4 there.

Figure 2:
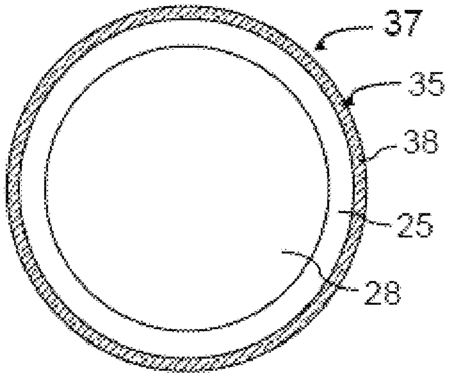
FIG. 2 is a schematic representation of a screen region of an elevator operating device which is arranged in the elevator system according to FIG. 1 on a floor.

The elevator operating device 4 arranged on the floor L1 in FIG. 1 displays the second graphical user interface 35 in the screen region 37. The second graphical user interface 35 shown comprises an example of a floor specification ("3"), symbols (24), and areas (28, 38); a more general representation of an embodiment of the second user interface 35 is shown in FIG. 2. The elevator system 1 is in a second operating mode in relation to this floor L1, in which operating mode the elevator call input at the elevator operating device 4 there is carried out and status information is displayed at this elevator operating device 4.

According to the more general representation of an embodiment of the second user interface 35 shown in FIG. 2, the second user interface 35 is divided into different zones, an edge zone 38, a center zone 28, and an intermediate zone 25. In one embodiment, the screen region 37 has a circular area. Correspondingly, in the embodiment shown, the edge zone 38 is annular and the center zone 28 is circular and is spaced apart from the edge zone 38. The annular intermediate zone 25 is located between the edge zone 38 and the center zone 28. These zones (25, 28, 38) form areas on the screen region 37, which are used to display status information according to the technology described herein.

A person skilled in the art would recognize that the screen region 37 and/or the zones (25, 28, 38) may deviate from the circular shape shown by way of example in another embodiment. The screen region 37 and/or at least one of the zones (25, 28, 38) can be configured as an oval or polygon, for example. A person skilled in the art would recognize that the areas formed by the zones (25, 28, 38) can be specified as desired; for example, the center zone 28 can have a smaller area, whereby the area of the intermediate zone 25 is increased. The same applies to the edge zone 38.

The edge zone 38 extends in the screen region 37 along a circumference of the screen region 37 and has a specified width, resulting in said area. The edge zone 38 is provided for symbolizing a waiting time until the elevator car 10 arrives on the (boarding) floor L, L1. In the embodiment shown, the waiting time is symbolized by the fact that the area is more or less filled; this surface filling is referred to below as the degree of filling. The degree of filling can, for example, be represented in color and/or by a pattern or structuring. A degree of filling of the edge zone 38 which changes along the circumference symbolizes a changing waiting time. For example, a decreasing degree of filling of the edge zone 38 symbolizes a decreasing waiting time. Examples of degrees of filling of the edge zone 38 are shown in FIGS. 1 and 3*c*-3*f*. In one embodiment, the degree of filling can represent the waiting time in seconds or minutes; a completely filled edge zone 38 can represent a waiting time of approximately 30 seconds or 60 seconds, for example.

The center zone 28 which is displayed separately from the edge zone 38 is provided for symbolizing an occupancy of the elevator car 10 by passengers P. As explained in more detail elsewhere in this description, the elevator system 1 has a sensor device 12 with which the occupancy of the elevator car 10 by passengers P (or objects) can be determined. The occupancy indicates, for example, whether the elevator car 10 is empty or full, or whether there are few or many passengers P in the elevator car 10. In the embodiment shown, the occupancy is symbolized by the fact that the area of the center zone 28 is more or less filled; this surface filling is referred to below as the degree of filling. The degree of filling can, for example, be represented in color and/or by a pattern or structuring. A changing degree of filling of the center zone 28 symbolizes a changing occupancy. For example, an increasing degree of filling of the center zone 28 symbolizes an increasing occupancy. Examples of degrees of filling of the center zone 28 are shown in FIGS. 1 and 3*c*-3*f*.

The intermediate zone 25 is provided for displaying a travel direction of the elevator car 10 that corresponds to the travel request. The travel direction can be displayed by means of a travel direction symbol 24 which can be configured analogously to the travel direction symbols 30, 32, for example. The travel direction symbol 24 indicates to the passenger P on the floor L, L1 that the elevator car 10 which departs next from this floor L, L2 is traveling in the displayed travel direction. An embodiment of the intermediate zone 25 with the travel direction symbol 24 is shown in FIGS. 1 and 3*c*-3*f*.

An elevator operating device 4 according to the technology described herein can be arranged on an elevator shaft door 11 or a shaft door frame of the elevator system 1 or on a building wall. Depending on the situation in the building, an elevator operating device 4 can also be arranged on a column standing on the ground of the floor. The elevator shaft door 11 separates the floor L, L1 from the elevator shaft 18; if the elevator car 10 is located on the floor L, L1, the car door thereof (not shown in FIG. 1), for example, can move the elevator shaft door 35 therewith. If the elevator operating device 4 is arranged on a shaft door 11, the elevator operating device 4 moves with the shaft door 11.

The elevator operating devices 4 are connected to the elevator controller 8 via a communication network 22. A communication line 20 connects the (car-side) elevator operating device 6 to the elevator controller 8. In one embodiment, the communication line 20 also connects a sensor device 12 arranged in or on the car 10 to the elevator controller 12.

The embodiment shown in FIG. 1 indicates that the sensor device 12 can comprise a load measuring device (represented by a symbol for a scale) and/or a camera device (represented by a symbol for a camera). The sensor device 12 determines a measure of an occupancy of the car 10, which measure is available to the elevator controller 8. This measure covers a range between a minimum occupancy (e.g., the car 10 is empty) and a maximum occupancy (e.g., the car 10 is full (maximum number of passengers or maximum load weight (payload))). With the load measuring device, for example, the load weight can be determined; this also allows conclusions to be drawn about the number of passengers. An elevator car 10 is usually equipped with a load measuring device which, for example, detects a load that exceeds the maximum load weight and generates a warning signal. For example, the passengers P (or objects) in the car 10 can be counted with the camera device. The camera device can be based on different measurement principles, e.g., categorized by optical range (visible, infrared) or evaluation (e.g., 3D camera). A person skilled in the art would recognize that a plurality of methods is available for determining the occupancy, that the sensor device 12 can be arranged at a location other than the car 10 in the elevator system 1, and that the functionality of the sensor device 12 can be implemented in whole or in part in the elevator controller 12.

In the situation shown in FIG. 1 and according to an embodiment of the elevator system 1, in the technology described herein, elevator operating devices 4 are advantageously used, which not only confirm the input of an elevator call to the passenger P but also offer additional functionalities to inform the passenger P according to the situation. The elevator operating device 4 on the floor L shows the travel direction symbols 30, 32 and thereby informs the passenger P, for example, that no elevator call input on this elevator operating device 4 is currently to be carried out and that the elevator control device 4 is available for inputting the desired travel direction. The elevator operating device 4 on the floor L1 informs the passenger P, after an elevator call has been input there, for example, as shown in FIG. 1, about the current position ("3" (symbol 26)) of the elevator car 10, the (half full) occupancy thereof (center zone 28), and the remaining waiting time (edge zone 38).

Figures 3A, 3B, 3C, 3D, 3E, 3F, 3G:
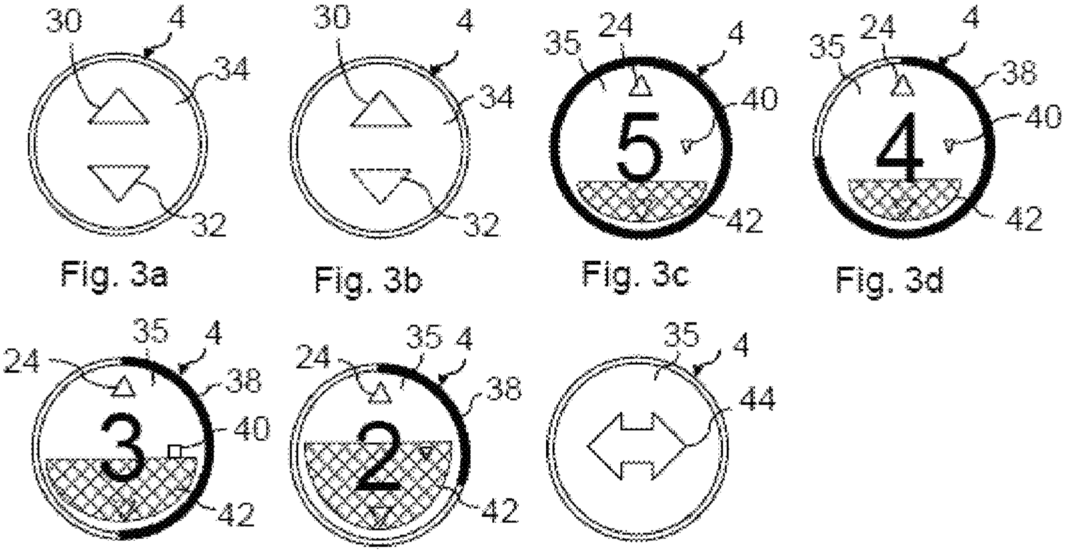
FIG. 3*a*-3*g* are schematic representations of an example of graphical user interfaces.

FIG. 3*a*-3*g* show schematic representations of an example of graphical user interfaces 34, 35. This representation represents, among other things, changes over time in the displayed user interfaces 34, 35. FIG. 3*a* shows the first graphical user interface 34 with the travel direction symbols 30, 32 as are also displayed by the elevator operating device 4 shown on the floor L in FIG. 1. FIG. 3*b* shows the first graphical user interface 34 after the passenger P has pressed the travel direction symbol 30 for a travel request in the upward direction. The travel direction symbol 30 can be optically emphasized (e.g., in color and/or by changing the brightness/illumination) in order to confirm to the passenger P that the call has been input. In contrast, the travel direction symbol 32 for the downward direction is not highlighted or deactivated; it may for example, no longer be visible. FIG. 3*b* shows the travel direction symbol 32 in dashed lines for the purpose of illustration.

FIG. 3*c*-3*g* show the second graphical user interface 35, as it is visible, for example, to the passenger P on the floor L1 after a call input, the floor L1 being the boarding floor. The desired travel direction of the passenger is in the upward direction, as shown (see FIG. 3*c*-3*f*) by the travel direction symbol 24 in the intermediate zone 25 (see FIG. 2). The direction of travel symbol 24 may be optically highlighted, for example, as discussed in connection with the travel direction symbols 30, 32, whereas such highlighting is not provided for a travel direction symbol in the downward direction. In FIG. 3*c*-3*f*, the travel direction symbol is shown in dashed lines in the downward direction for the purpose of illustration.

In order to carry out the elevator call, the elevator controller 8 causes a motion of the elevator car 10 to the boarding floor (L1), unless the elevator car 10 is already located on the boarding floor (L1). In the embodiment shown, the elevator car 10 is moved to the boarding floor (L1). The movement of the elevator car 10 in the direction of the boarding floor (L1) is represented by a car motion symbol 40 which is displayed in the center zone 28, for example. The car motion symbol 40 shows the travel direction of the elevator car 10 in FIG. 3*c*, 3*d*, 3*f*. The current position of the elevator car 10 is represented by a numerical floor specification in the center zone 28. According to the embodiment shown in FIG. 3*c*-3*f*, the elevator car 10 is moved in the downward direction from the floor "5" to the floor "2" (see car motion symbol 40).

In FIG. 3*c*-3*f*, the center zone 28 is more or less filled in by an occupancy indicator 42;

the area of the center zone 28 filled by the occupancy indicator 42 is referred to as the degree of filling. The occupancy indicator 42 or the degree of filling symbolizes the occupancy of the elevator car 10 by passengers P. In the embodiment shown, the occupancy indicator 42 is configured to fill the circular center zone 28 from below (e.g., empty elevator car 10) to the top (increasing occupancy of the elevator car 10). The occupancy indicator 42 can be optically highlighted, for example, by a color and/or lighting selection and/or by a selection of a surface pattern. A person skilled in the art would recognize that the occupancy indicator 42 can also be configured differently in order to clearly symbolize the occupancy; for example, one or more circular or polygonal areas (e.g., circles or bars) of variable size can be displayed.

In FIG. 3*e*, the (square) car motion symbol 40 indicates that the elevator car 10 is on the floor "3," In this embodiment, at least one additional passenger P enters the elevator car 10. Because no passenger P gets out, the occupancy increases. The increased occupancy of the elevator car 10 is shown in FIG. 3*f* by a higher degree of filling, e.g., by a larger-area occupancy indicator 42.

FIG. 3*g* shows an embodiment of the second graphical user interface 35 at a time when the elevator car 10 arrives at the boarding floor (L1). The arrival can be communicated to the passenger P, for example, before the shaft door 11 is opened. The notification can be made, for example, by an operating symbol 44, a pictogram 44, and/or text being displayed. FIG. 3*g* shows a horizontally arranged double arrow which symbolizes an opening shaft door 11. At least the center zone 28 or a region thereof can be used for the display; in addition, the intermediate zone 25 can be used. A person skilled in the art would recognize that the notification can be supplemented by an acoustically perceptible notification.

As the elevator car 10 moves in the direction of the boarding floor (L1), the waiting time for the passenger P waiting there changes. The waiting time is displayed to the passenger P by means of the edge zone 38. As mentioned above, the degree of filling of the edge zone 38 symbolizes the waiting time. In FIG. 3*c*, the edge zone 38 is substantially completely filled and is shown as a blackened area. Starting from this state, the waiting time is reduced. In FIG. 3*d*-3*f*, this is symbolized by a blackened area that becomes smaller. No waiting time is displayed in FIG. 3*g* because the elevator car 10 has arrived at the boarding floor (L1).

Figure 4:
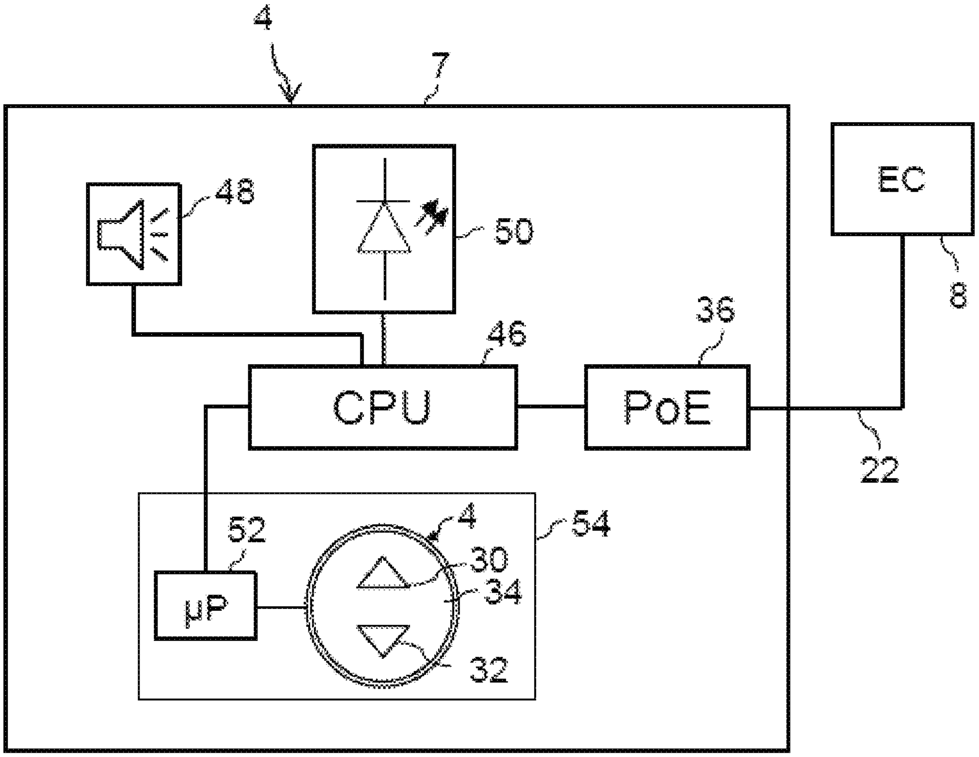
FIG. 4 is a schematic representation of an example of components arranged in the elevator operating device and the connections thereof.

FIG. 4 shows a schematic representation of an elevator operating device 4 with components which, according to an embodiment, are arranged therein, for example, in a carrier element or on or on top of a carrier element. In the following, the components are arranged on a carrier element 7 which can for example, be inserted into the building wall or the shaft door 11. A person skilled in the art would recognize that the arrangement of these components and the manner in which they are communicatively connected are exemplary. In the embodiment shown, a touch-sensitive screen system 54, a central control device 46 (CPU), an illumination device 50, an electro-acoustic transducer 48 (e.g., a speaker), and a communication device 36 (PoE, Power over Ethernet) are arranged in the carrier element 7. The central control device 46 is communicatively connected to the components mentioned in order to ensure the operation and the functions of the elevator operating device 4.

The touch-sensitive screen system 54 is referred to below as the touchscreen 54. In the embodiment shown, the touchscreen 54 comprises a transparent glass or plastics plate (not shown) and a processor 52. The graphical user interfaces 34, 35 displayed by a display device of the touchscreen 54, depending on the operating mode, are visible to the passenger P through the transparent glass or plastics plate. The processor 52 is connected to the central control device 46 and generates, for example, a signal when a passenger P touches one of the directional symbols 30, 32 with a finger; the processor 52 controls the display device, the electro-acoustic transducer 38, and/or the illumination device 50 in order to confirm the input to the passenger P. In one embodiment, the central control device 46 controls the transducer 38 (speaker) in order to communicate the input elevator call to the passenger P also audibly, for example, by means of speech. The structure and function of a touchscreen, in particular for inputting calls, are known to a person skilled in the art, and further explanations therefore do not appear to be necessary.

In one embodiment, the touchscreen 54 has a specified size, for example, specified as a diameter, if the screen region 37 is circular, or as width and length (or height) or as a screen diagonal, if the screen region 37 is rectangular, for example. The selected shape and size of the touchscreen 54 or the screen region 37 thereof can depend on which area or which portion of the touchscreen 54 is specified as the usable area (for touching and/or displaying information). A person skilled in the art would recognize that the size of the screen region 37 can be selected in accordance with the requirements specified for the building, for example, the number of floors and/or the type or use of the building (regular/irregular passengers who are familiar/not familiar with the building and therefore need less/more information).

The illumination device 50 is used to illuminate the touchscreen 54 or the user interfaces 34, 35 of the elevator operating device 4, or only regions of the user interfaces 34, 35. Controlled by the central control device 46, the illumination device 50 can illuminate the user interfaces 34, 35 or selectively illuminate them, so that the displayed travel direction symbols 30, 32 and, for example, the symbolizations of the waiting time and the occupancy of the passenger P are perceptible, in particular in poor lighting conditions. The illumination device 50 can also illuminate the user interfaces 34, 35 or individual symbols and zones with colored light, for example, in order to confirm the input of an elevator call. In one embodiment, the illumination device 50 comprises one or more LED light sources.

The communication network 22 connects the elevator operating devices 4 on the floor side to the elevator controller 8 and thus makes communication possible between the elevator controller 8 and the elevator operating devices 4. For this communication, the elevator operating devices 4 and the elevator controller 8 can be directly or indirectly connected to the communication network 22. The communication network 22 can comprise a communication bus system, individual data lines, or a combination thereof. Depending on the implementation of the communication network 22, individual addresses and/or identifiers can be allocated to the elevator controller 8 and each elevator operating device 4, such that, for example, the elevator controller 8 can send a message to a desired elevator operating device 4 in a targeted manner. Communication can take place in accordance with a protocol for wired communication, for example, the Ethernet protocol. In one embodiment, the elevator operating devices 4 are supplied with electrical energy via the communication network 22 (PoE).

Figure 5:
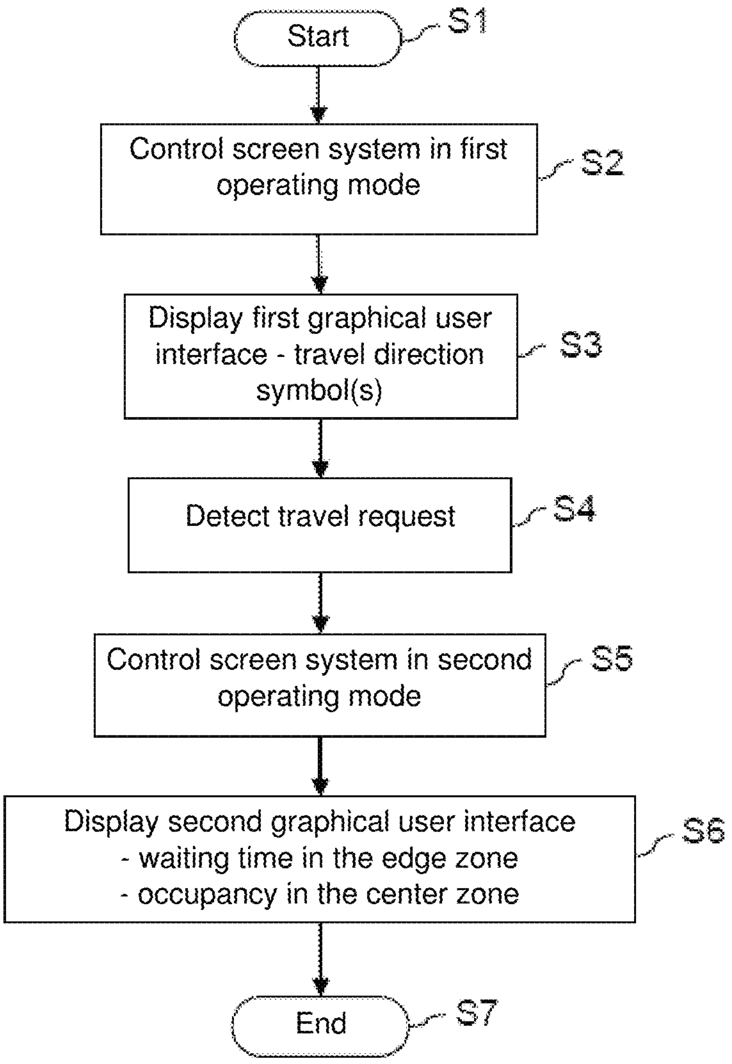
FIG. 5 is an example of a representation of an embodiment of a method for operating the elevator system.

With the understanding of the above-described basic system components of the elevator system 1, the elevator operating device 4, and the functionalities thereof, a description of an example of a method for operating the elevator system 1 shown in FIG. 1 is given below with reference to FIG. 5. FIG. 5 shows an example of a flow chart of the method; it begins at step S1 and ends at step S7. A person skilled in the art would recognize that the division into these steps is by way of example and that one or more of these steps may be divided into one or more sub-steps or that a plurality of the steps may be combined into one step.

The method is described with reference to a passenger P who is located on a (current) floor L, L1. At the elevator operating device 4 arranged there, the passenger P would like to input a travel request (call) in order to be transported from a current floor L, L1 to a destination floor L, L1 by the elevator. From this floor L, L1, the passenger P can wish to travel in the upward direction or downward direction; the destination floor L, L1 can be located above or below the (current) floor L, L1. The floor L, L1 is therefore an intermediate floor; such a situation is described below. However, the passenger P can also be on a bottom or top floor L, L1, from which only one travel direction is possible.

If the elevator system 1 is ready for operation and the elevator operating device 4 on the floor L, L1 is ready for the input of an elevator call, in a step S2, the screen system 54 of the elevator operating device 4 is controlled in a first operating mode. In a step S3, the first graphical user interface 34 is displayed in this first operating mode. The first graphical user interface 34 displays at least one travel direction symbol 30, 32. In the situation described herein, the passenger P is located on an intermediate floor; the graphical user interface 34 therefore displays the travel direction symbols 30, 32 in the upward direction and the downward direction.

In a step S4, the travel request of the passenger P is detected. It is also detected which travel direction symbol 30, 32 the passenger P is touching. The elevator call is transmitted from the elevator operating device 4 to the elevator controller 8. The elevator controller 8 detects the floor L, L1 on which the elevator call is input and which travel direction is desired. The elevator controller 8 then causes the elevator call to be carried out in a known manner and, among other things, an elevator car 10 on the floor L, L1 (boarding floor) is made available.

In a step S5, the screen system 54 of the elevator operating device 4 is controlled in a second operating mode. In a step S6, the second graphical user interface 35 is displayed in this second operating mode. The second graphical user interface 34 displays the waiting time in the edge zone 38 and the occupancy in the center zone 28, as described above in connection with FIG. 1-3*f.*

The elevator controller 8 records measured values with which the current position of the elevator car 10 can be determined. From the current position of the elevator car 10, the elevator controller 8 determines the remaining time until the elevator car 10 arrives at the boarding floor. The length of time is determined continuously while the elevator car 10 is being moved in the direction of the boarding floor; any intermediate stops on other floors can also be taken into account. The elevator controller 8 transmits the determined time period to the elevator operating device 4 so that it displays the time period as a waiting time in the edge zone 38. A person skilled in the art would recognize that the elevator car 10 may already be on the boarding floor; in this case, no display of the waiting time is provided.

The elevator controller 8 also records measured values with which the current occupancy of the elevator car 10 can be determined. The occupancy is determined, for example, at the beginning of the motion of the elevator car 10 and at a possible intermediate stop, when passengers P get on or off. The elevator controller 8 transmits the determined occupancy to the elevator operating device 4 so that it displays the occupancy in the center zone 28.

The invention claimed is:

1. An elevator operating device for inputting a travel request on a floor of a building in which an elevator system having an elevator car and an elevator controller is arranged, the device comprising:

a communication device configured to communicate with the elevator controller;

a touch-sensitive screen system comprising a screen region that is visible to a passenger; and a central control device communicatively connected to the communication device and the screen system, wherein the central control device is configured to control the screen system in a first elevator operating mode, in order to display a first graphical user interface on the screen region, and to control the screen system in a second elevator operating mode, in order to display a second graphical user interface on the screen region, wherein the first graphical user interface comprises one or two travel direction symbols, and wherein the second graphical user interface comprises:

an edge zone that extends in the screen region along a circumference of the screen region and has a specified width, wherein the edge zone is configured to symbolize a waiting time until the elevator car arrives on the floor, wherein a degree of filling of the edge zone which changes along the circumference symbolizes a changing waiting time, and a center zone displayable separately from the edge zone configured to symbolize an occupancy of the elevator car by passengers, wherein a displayed degree of filling of the center zone symbolizes an occupancy of the elevator car.

2. The device of claim 1, wherein the degree of filling of the edge zone which changes along the circumference is a decreasing degree of filling of the edge zone, and symbolizes a decreasing waiting time.

3. The device of claim 1, wherein the center zone of the second graphical user interface is configured to displaying a floor on or in the vicinity of which the elevator car is located.

4. The device of claim 1, wherein the center zone is configured to display a travel direction of the elevator car.

5. The device of claim 1, wherein the second graphical user interface further comprises an intermediate zone arranged between the edge zone and the center zone, wherein the intermediate zone is configured to display a travel direction of the elevator car that corresponds to the travel request.

6. The device of claim 5, wherein the center zone is circular and the intermediate zone is annular.

7. The device of claim 1, wherein the center zone is configured to display an operating symbol, a pictogram, or text.

8. The device of claim 1, wherein the screen region is circular.

9. The device of claim 8, wherein the edge zone is annular.

10. An elevator system comprising the elevator operating device of claim 1.

11. The elevator system of claim 10, further comprising a sensor device configured to determine an occupancy of the elevator car by passengers.

12. The elevator system of claim 10, wherein the elevator operating device is arranged on a shaft door or a shaft door frame of the elevator system or on a building wall.

13. A method for operating the elevator system, the method comprising:

controlling a touch-sensitive screen system of an elevator operating device that is arranged on a floor of a building in a first elevator operating mode, in order to cause a first graphical user interface that comprises one or two travel direction symbols to be displayed in a screen region of the touch-sensitive screen system, which screen region is visible to a passenger;

detecting a travel request when a passenger touches a travel direction symbol;

controlling the touch-sensitive screen system in a second elevator operating mode to cause a second graphical user interface to be displayed in the screen region, the second graphical user interface comprising:

an edge zone that extends in the screen region along a circumference of the screen region and has a specified width, wherein the edge zone is configured to symbolize a waiting time until the elevator car arrives on the floor, wherein a degree of filling of the edge zone which changes along the circumference symbolizes a changing waiting time, and a center zone that can be displayed separately from the edge zone and is configured to symbolize an occupancy of the elevator car by passengers, wherein a displayed degree of filling of the center zone symbolizes an occupancy of the elevator car.

14. The method of claim 13, further comprising determining, with a sensor device, an occupancy of the elevator car by passengers.

* * * * *